United States Patent
John Wilson et al.

(10) Patent No.: US 10,951,376 B2
(45) Date of Patent: *Mar. 16, 2021

(54) SIGNALING BEAMFORMING RELATIONSHIPS BETWEEN CONTROL AND DATA CHANNELS

(71) Applicant: QUALCOMM Incorporated, San Diego, CA (US)

(72) Inventors: Makesh Pravin John Wilson, San Diego, CA (US); Tao Luo, San Diego, CA (US); Ashwin Sampath, Skillman, NJ (US); Sumeeth Nagaraja, Los Altos, CA (US); Sundar Subramanian, San Diego, CA (US); Juergen Cezanne, Ocean Township, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,590

(22) Filed: Aug. 26, 2019

(65) Prior Publication Data

US 2019/0379512 A1    Dec. 12, 2019

Related U.S. Application Data

(63) Continuation of application No. 15/713,074, filed on Sep. 22, 2017, now Pat. No. 10,396,959.

(Continued)

(51) Int. Cl.
*H04L 5/00* (2006.01)
*H04B 7/0408* (2017.01)
(Continued)

(52) U.S. Cl.
CPC ......... *H04L 5/0053* (2013.01); *H04B 7/0408* (2013.01); *H04B 7/0617* (2013.01);
(Continued)

(58) Field of Classification Search
CPC .. H04L 5/0053; H04L 5/0051; H04W 72/048; H04W 72/0446; H04W 72/046
See application file for complete search history.

(56) References Cited

U.S. PATENT DOCUMENTS 6,606,314 B1    8/2003    Bahrenburg et al.
8,009,617 B2    8/2011    Sarkar et al.
(Continued)

FOREIGN PATENT DOCUMENTS

CN    105009473 A    10/2015
JP    2016529778 A    9/2016
(Continued)

OTHER PUBLICATIONS

Article 34 as filed in PCT/US2017/053227.
(Continued)

*Primary Examiner* — Rina C Pancholi
(74) *Attorney, Agent, or Firm* — Patterson & Sheridan LLP; James Hunt Yancey, Jr.

(57) ABSTRACT

Certain aspects of the present disclosure provide techniques for signaling information regarding beams used for data and control transmissions to a receiving entity.

32 Claims, 9 Drawing Sheets

Related U.S. Application Data

(60) Provisional application No. 62/420,036, filed on Nov. 10, 2016.

(51) Int. Cl.
  *H04B 7/06* (2006.01)
  *H04L 1/00* (2006.01)
  *H04W 16/28* (2009.01)
  *H04W 72/04* (2009.01)

(52) U.S. Cl.
  CPC .......... *H04L 1/0027* (2013.01); *H04L 5/0023* (2013.01); *H04L 5/0044* (2013.01); *H04L 5/0091* (2013.01); *H04W 16/28* (2013.01); H04L 5/0048 (2013.01); H04L 5/0051 (2013.01); *H04W 72/046* (2013.01); *H04W 72/048* (2013.01); H04W 72/0446 (2013.01)

(56) References Cited

U.S. PATENT DOCUMENTS

| | | | |
|---|---|---|---|
| 8,867,493 | B2 | 10/2014 | Gorokhov et al. |
| 9,014,301 | B2 | 4/2015 | Yang et al. |
| 9,094,145 | B2 | 7/2015 | Yue et al. |
| 9,642,165 | B2 | 5/2017 | Jung et al. |
| 10,396,959 | B2 | 8/2019 | John et al. |
| 2007/0195736 | A1 | 8/2007 | Taira et al. |
| 2013/0286960 | A1 | 10/2013 | Li et al. |
| 2014/0036804 | A1 | 2/2014 | Chen et al. |
| 2014/0211731 | A1 | 7/2014 | Inoue et al. |
| 2015/0009968 | A1* | 1/2015 | Yu .................. H04B 7/0408 370/336 |
| 2015/0257130 | A1* | 9/2015 | Lee .................. H04L 5/0092 370/336 |
| 2016/0302203 | A1* | 10/2016 | Liu .................. H04L 5/001 |
| 2017/0332368 | A1 | 11/2017 | Einhaus et al. |

FOREIGN PATENT DOCUMENTS

| | | |
|---|---|---|
| KR | 20150006381 A | 1/2015 |
| KR | 20150030661 A | 3/2015 |
| KR | 20150065666 A | 6/2015 |
| WO | 2009023863 A1 | 2/2009 |
| WO | 2010088664 A2 | 8/2010 |
| WO | 2015005641 A1 | 1/2015 |
| WO | 2015174616 A1 | 11/2015 |
| WO | 2015174731 A1 | 11/2015 |

OTHER PUBLICATIONS

International Preliminary Report on Patentability—PCT/US2017/053227, The International Bureau of WIPO—Geneva, Switzerland, dated Jan. 23, 2019.
International Search Report and Written Opinion—PCT/US2017/053227—ISA/EPO—dated Jan. 12, 2018.
Nokia, Alcatel-Lucent Shanghai Bell: "Extended Framework for QCL Assumptions," R1-1612858, 3GPP TSG-RAN WG1 #87, Reno, USA, Nov. 14-18, 2016, 3 pages, Retrieved from the Internet: URL: http://www.3gpp.org/ftp/tsg_ran/WG1_RL1/TSGR1_87/Docs/R1-1612858.zip.
Samsung: "Discussions on CSI-RS design for NR MIMO," R1-1612494, 3GPP TSG RAN WG1 #87, Reno, USA, Nov. 14-18, 2016, 4 Pages, Retrieved from the Internet: URL: http://www.3gpp.org/ftp/tsg_ran/WG1_RL1/TSGR1_87/Docs/R1-1612494.zip.
Korean IP Office (KIPO) Action issued in Application No. 10-2019-7032083, dated Jan. 4, 2021, 6 pages. Applicant provides KIPO Office Action and English Translation (both provided by KR Counsel).

* cited by examiner

SIGNALING BEAMFORMING RELATIONSHIPS BETWEEN CONTROL AND DATA CHANNELS

CROSS-REFERENCE TO RELATED APPLICATIONS & PRIORITY CLAIM

This application is a continuation of U.S. patent application Ser. No. 15/713,074, filed Sep. 22, 2017 which claims benefit of and priority to U.S. Provisional Patent Application Ser. No. 62/420,036, filed Nov. 10, 2016, both of which are herein incorporated by reference in their entireties for all applicable purposes.

TECHNICAL FIELD

Aspects of the present disclosure relate to wireless communications, and more particularly, signaling information regarding beams used for data and control transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication that may be performed by a transmitting entity. The method generally includes signaling, to a receiving entity, information regarding a relationship between beams used for data and control transmissions to the receiving entity and sending the data and control transmissions using the beams.

Certain aspects of the present disclosure provide a method for wireless communication that may be performed by a receiving entity. The method generally includes receiving signaling, from a transmitting entity, information regarding a relationship between beams used for data and control transmissions to the receiving entity and processing the data and control transmissions, based on the information.

Certain aspects of the present disclosure provide an apparatus for wireless communication generally including at least one processor and a transmitter. The processor is generally configured to obtain information regarding a relationship between beams used for data and control transmissions to a receiving entity. The transmitter is generally configured to signal the information to the receiving entity and to send the data and control transmissions using the beams.

Certain aspects of the present disclosure provide an apparatus for wireless communication generally including a receiver and at least one processor The receiver is generally configured to receive, from a transmitting entity, information regarding a relationship between beams used for data and control transmissions to the apparatus. The processor is generally configured to process the data and control transmissions, based on the signaled information.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
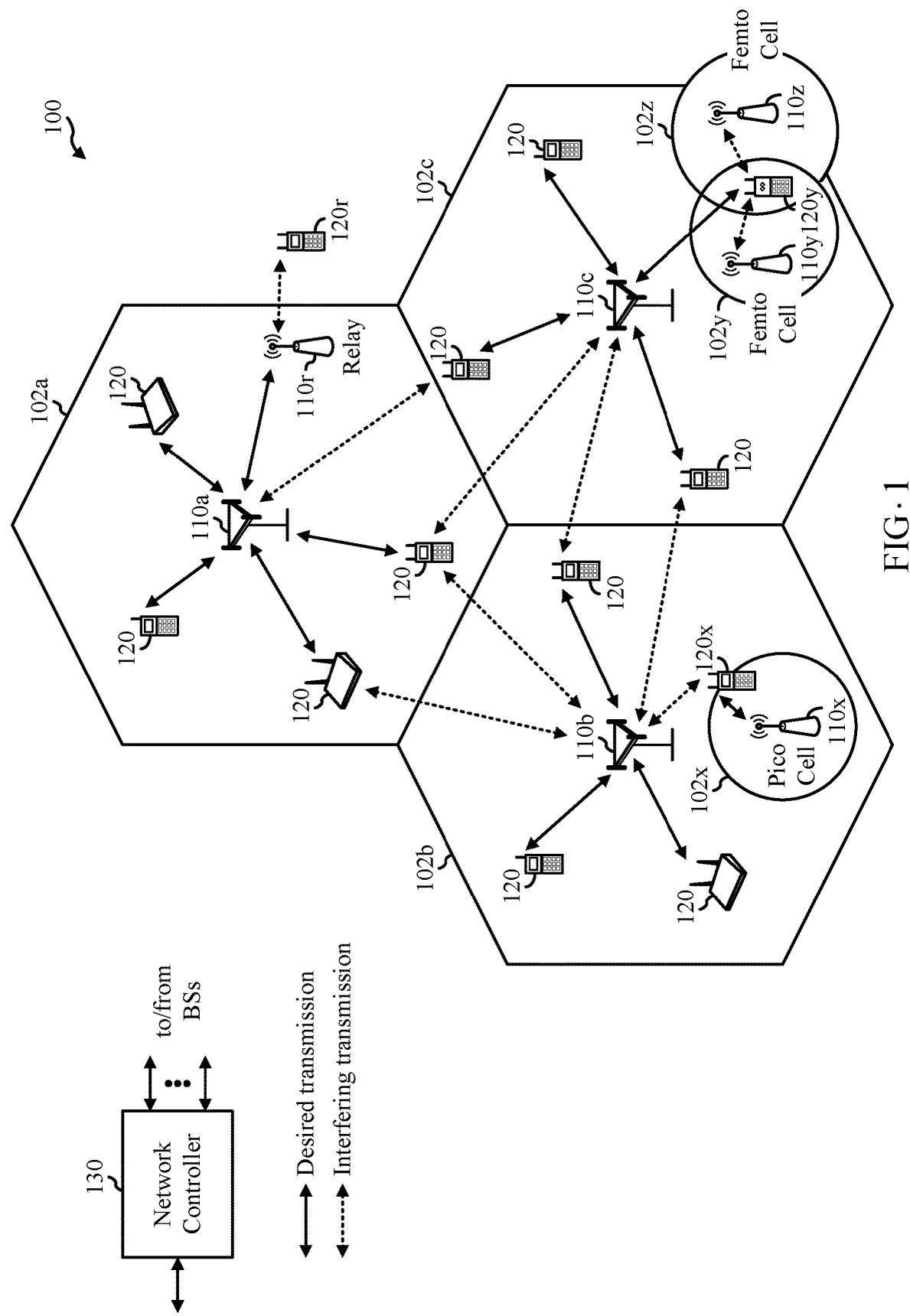
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI), wherein a TTI may refer to a subframe or portion of a subframe (e.g., a time slot) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams. As described herein, a BS may monitor active beams using measurements of reference signals (e.g., MRS, CSI-RS, synch) transmitted via reference beams.

UEs 120 may be configured to perform the operations 1000 and methods described herein for detecting a mobility events based, at least in part, on mobility parameters associated with a beam set. BS 110 may comprise a transmission reception point (TRP), Node B (NB), 5G NB, access point (AP), new radio (NR) BS, etc.). BS 110 may be configured to perform the operations 900 and methods described herein for configuring beam sets and mobility parameters associated with each of the beam sets. The BS may receive an indication of a detected mobility event based on the mobility parameters and may make a decision regarding mobility management of the UE based on the event trigger.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., abase station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
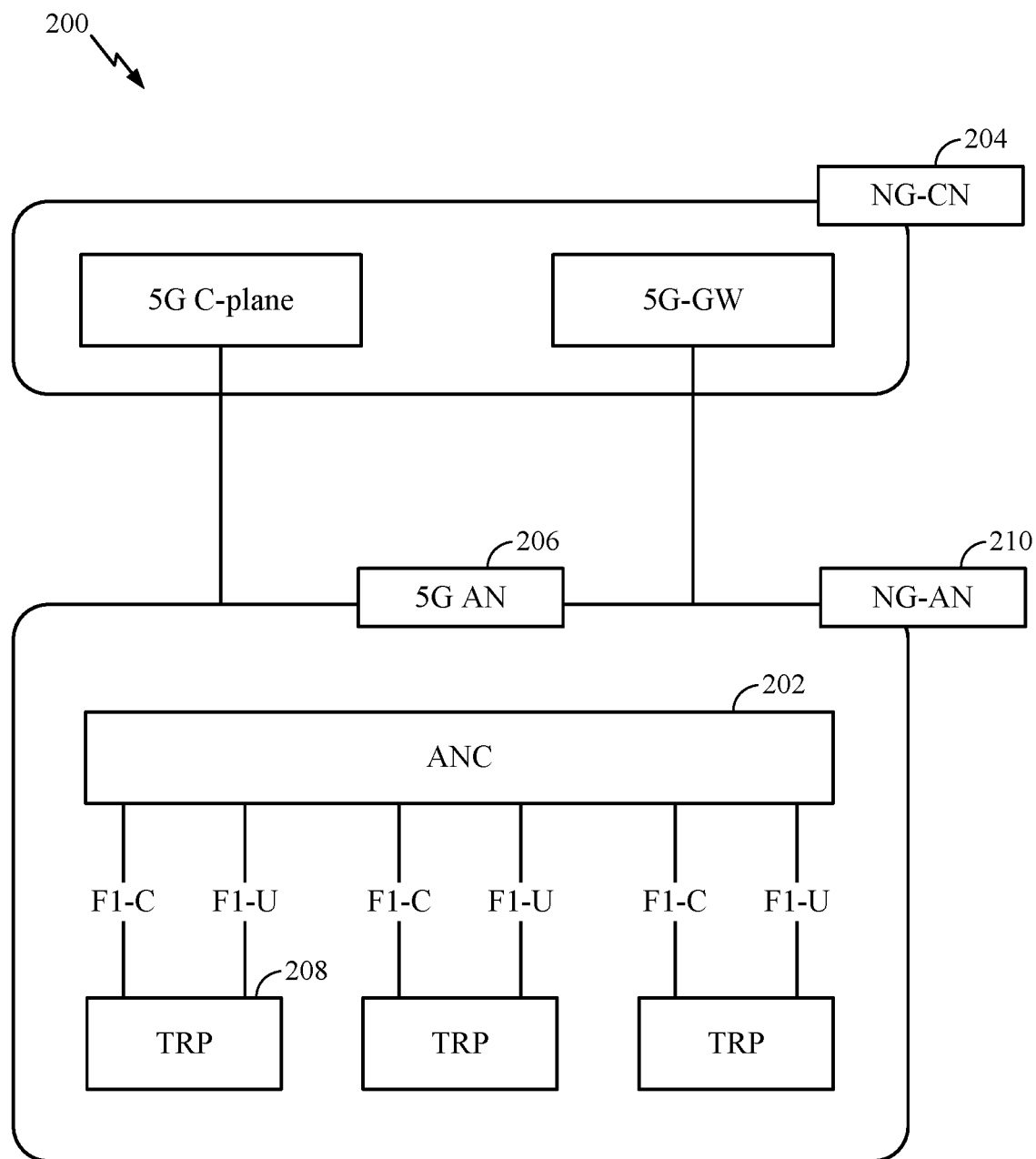
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/ or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/ present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
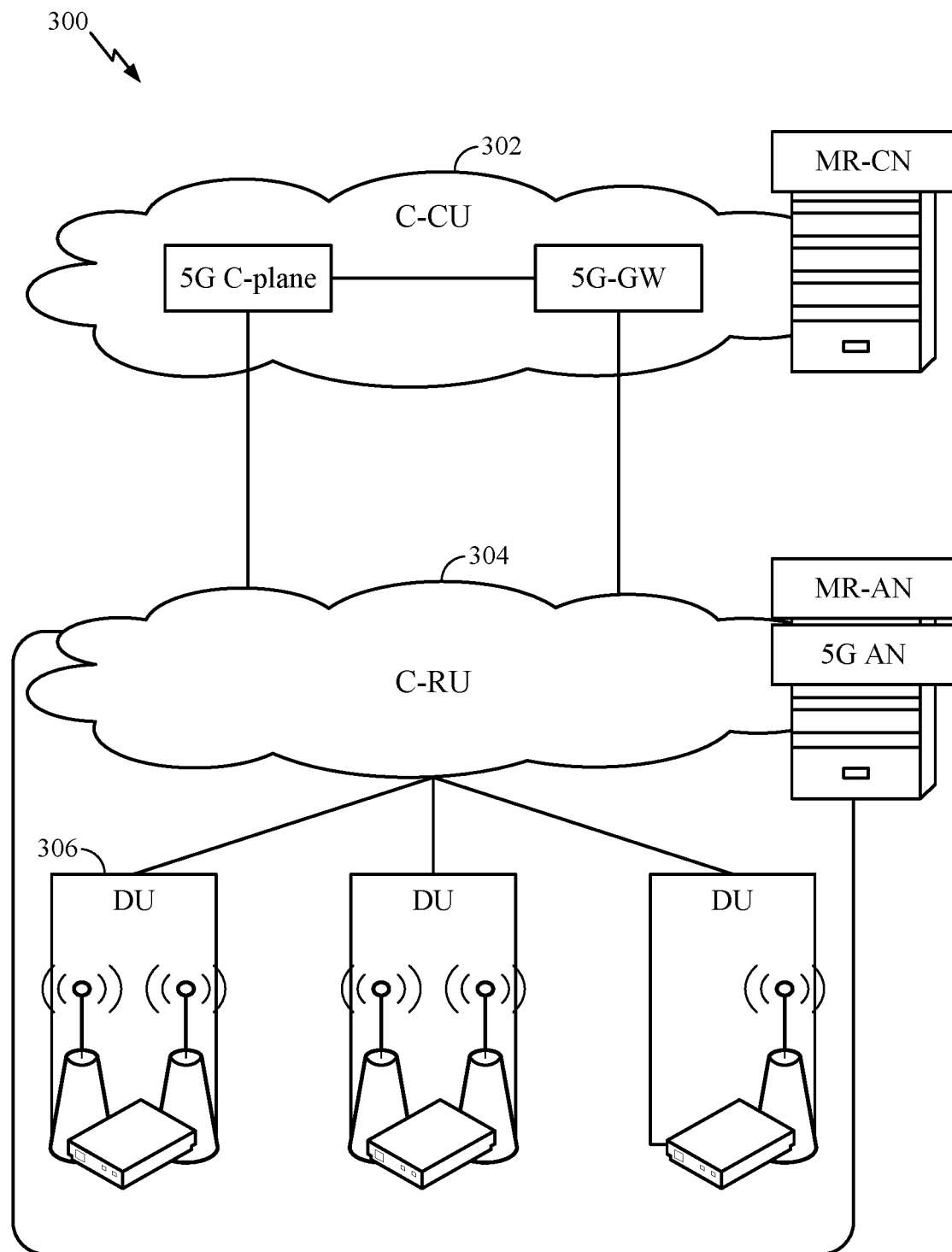
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
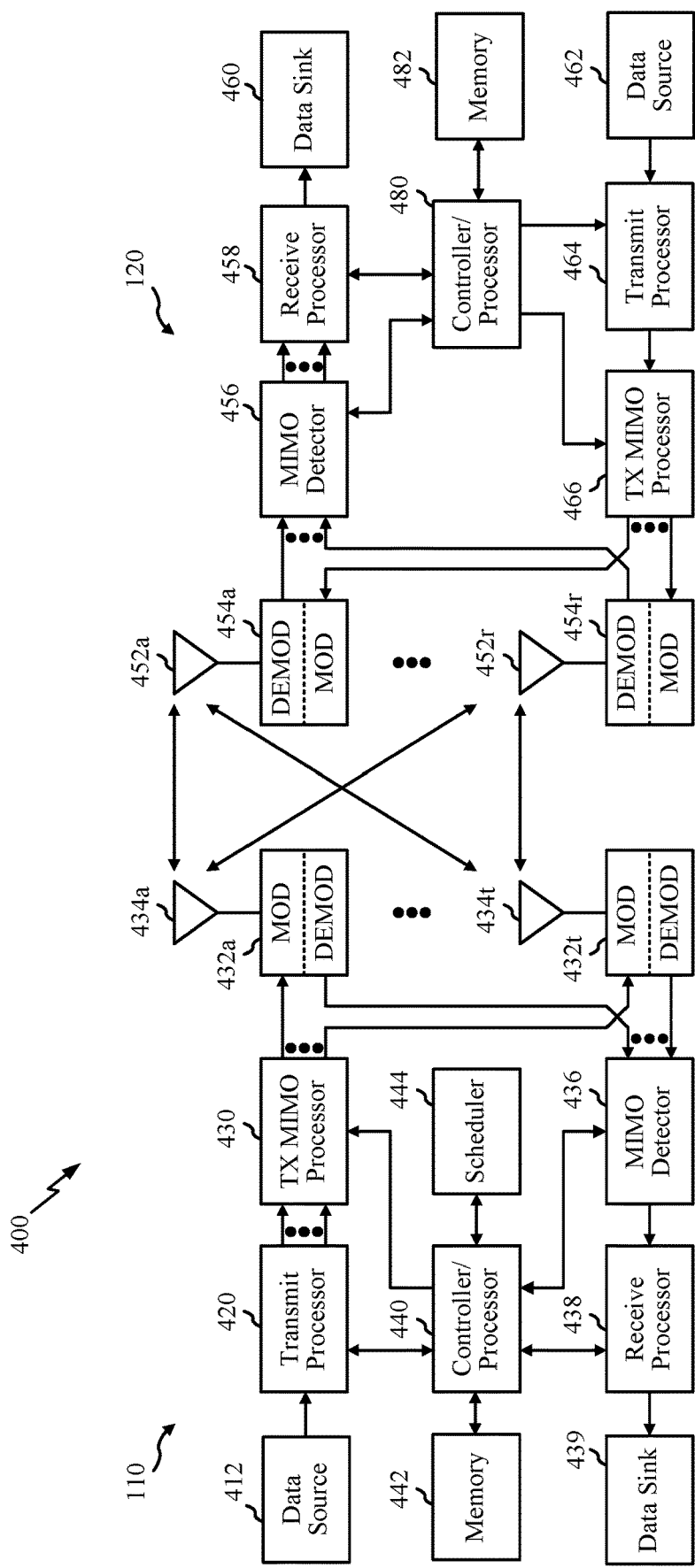
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The processor 480 and/or other processors and modules at the UE 120 may also perform or direct, e.g., the execution of the corresponding/complementary processes for the techniques described herein and as illustrated in FIG. 10. The memories 442 and 482 may store data and program codes for the BS 110 and the UE 120, respectively. A scheduler 444 may schedule UEs for data transmission on the downlink and/or uplink.

Figure 5:
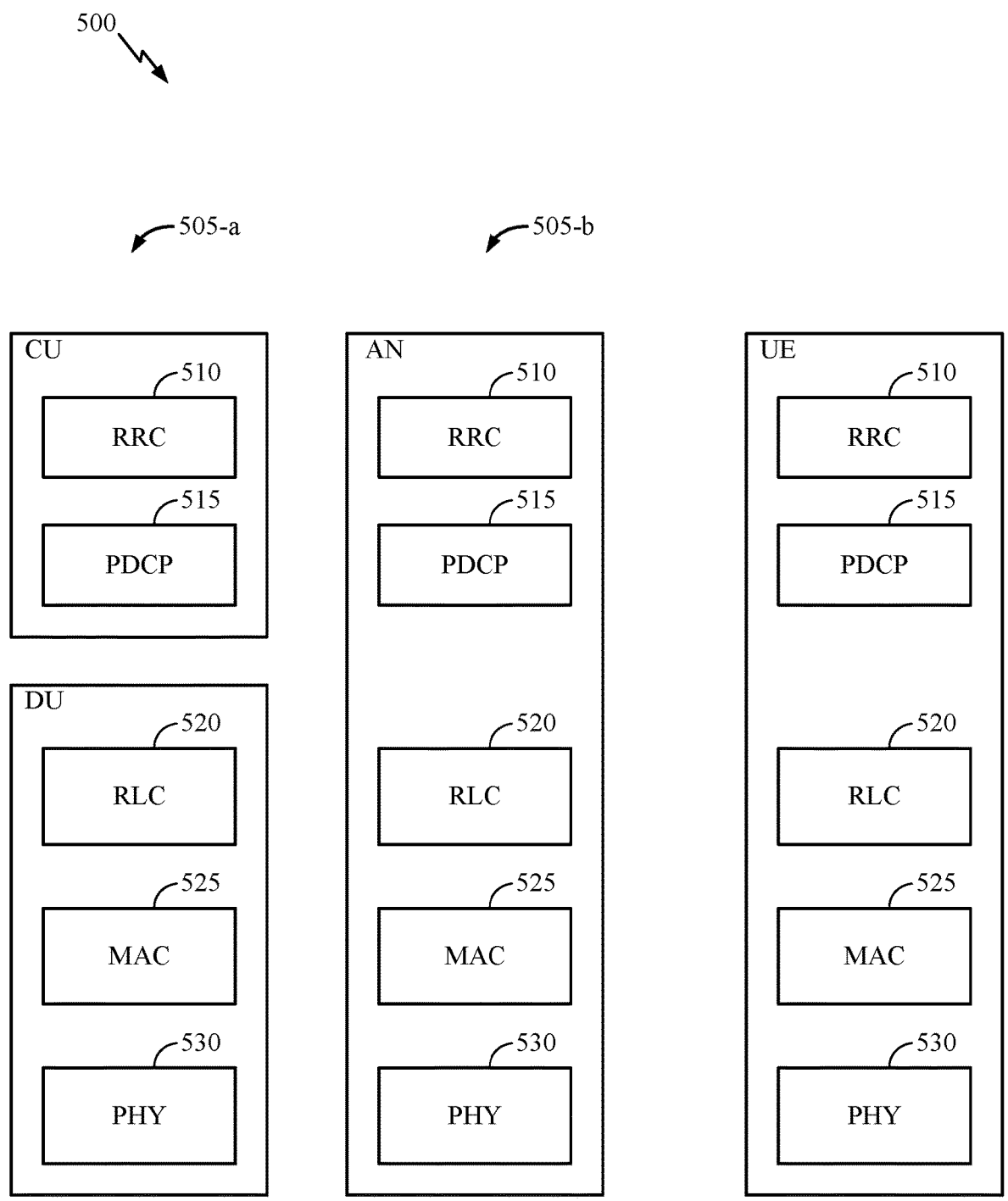
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
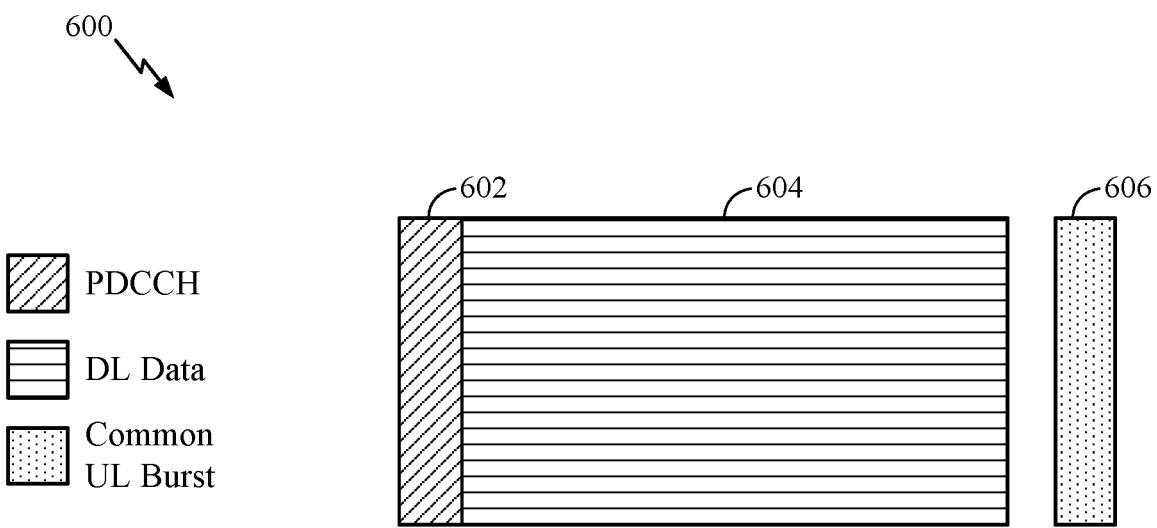
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602 and 604. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
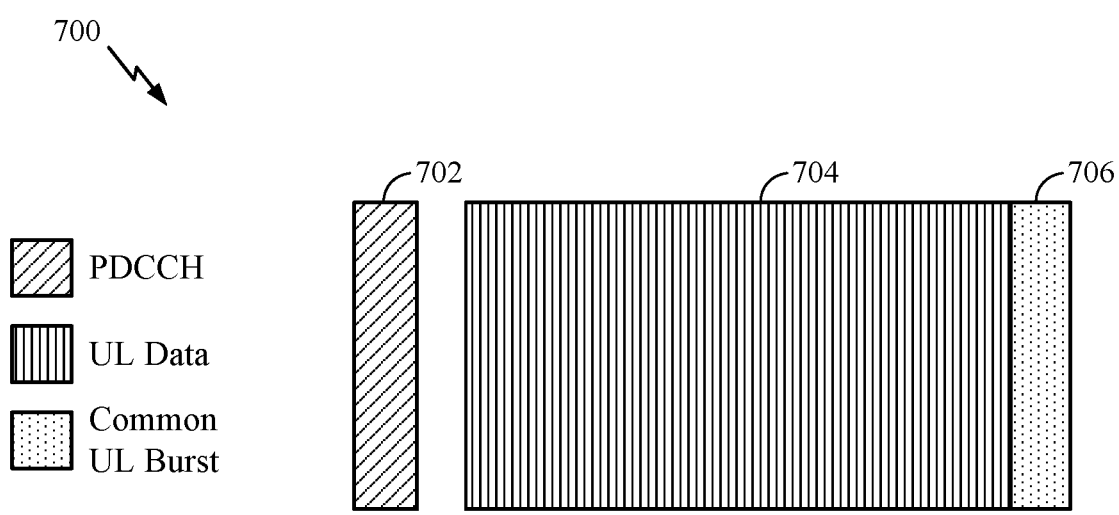
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may include additional or alternative information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

mmWave Systems

As used herein, the term mmWave generally refers to spectrum bands above 6 GHz in very high frequencies for example 28 GHz. Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave can be leveraged to form narrow directional beams that can send and receive more energy, which may help overcome the propagation/path loss challenges.

These narrow directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked. Aspects of the present disclosure may take advantage of such directional beams, for example, by using sets of beams for beam and cell mobility management.

Figure 8:
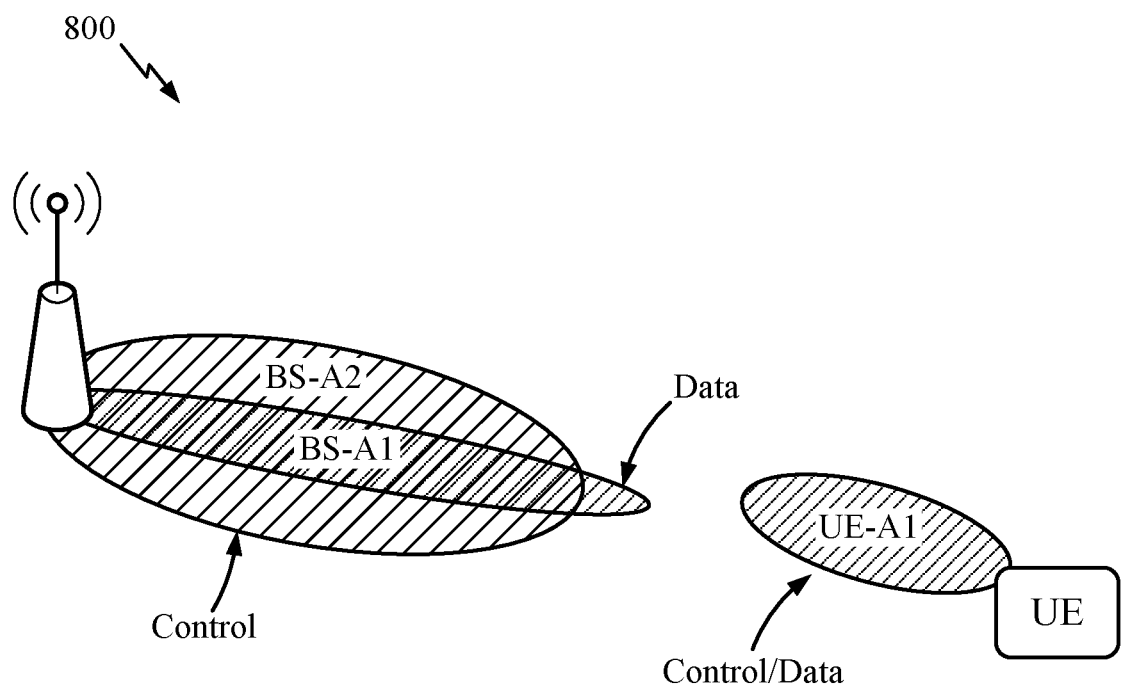
FIG. 8 illustrates an example of active beams, in accordance with certain aspects of the present disclosure.

FIG. 8 illustrates an example of active beams 800, in accordance with aspects of the present disclosure. A BS and a UE may communicate using a set of active beams. Active beams may refer to BS and UE beam pairs that are used to transmit data and control channels. A data beam may be used to transmit data and a control beam may be used to transmit control information. As illustrated in FIG. 8, data beam BS-A1 may be used to transmit DL data and control beam BS-A2 may be used to transmit DL control information. A control beam, which may serve more than one UE, may be broader than a data beam. A control/data beam UE-A1 may be used to transmit both control and data. As illustrated, both UL control and data are transmitted using a same beam; however, the data and control information may be transmitted using different beams. Similarly, data and control may be transmitted by the BS using different beams or a same beam.

In wireless communication systems employing beams, such as mmWave systems, high path loss may present a challenge. Accordingly, techniques including hybrid beamforming (analog and digital), which are not present in 3G and 4G systems, may be used in such wireless systems. Hybrid beamforming creates narrow beam patterns to users (e.g., UEs), which may enhance link budget/SNR. As described above, a BS and UE may communicate over active beams. Active beams may be referred to as serving beams. Active beams may include BS and UE beam pairs that carry data and control channels such as PDSCH, PDCCH, PUSCH, PUCCH, synchronization signals (SS), channel-state information reference signals (CSI-RS), sounding RS (SRS), phase-tracking RS (PTRS), time tracking RS (TRS).

A BS may monitor beams using beam measurements and feedback from a UE. For example, a BS may monitor active beams using DL reference signals. A BS may transmit a DL RS, such as a measurement reference signal (MRS), channel state information reference signal (CSI-RS), or a synchronization (synch) signal. A UE may report, to the BS, a reference signal receive power (RSRP) associated with a received reference signal. In this manner, the BS may monitor active beams.

Sets of active beams may have different functionalities, characteristics, and requirements. Stated otherwise, the functionalities of one or more active beams may be different than the functionalities other active beams. For example, a first set of active beams may include control beam and a second set of active beams may include data transmissions. As another example, beams in a first set of active beams may be transmitted in a first direction and beams in a second set of active beams may be transmitted in a second direction, different than the first direction. During multi-link communication, a UE may simultaneously be connected to a first BS in the first direction and to a second BS in the second direction. Beam shapes for each beam set of the active beams may vary. For example, as described above, the shape of control beams from a BS may be different than a shape of data beams from the same base station.

Example Signaling Beamforming Relationships
Between Control and Data Channels

In wireless communications, knowledge about various factors may help aid in processing control and data transmissions. For example, in NR, channel estimation for data demodulation (e.g. PDSCH) may be enhanced by estimating various channel parameters, such as delay spread, Doppler, frequency error, timing offset, and the like. If an indication is provided that control and data transmissions are likely to experience similar channel conditions, reference Signals in the control region serve as a good candidate to estimate these parameters, which in turn, can be utilized for channel estimation for the data region. If the spatial parameters and properties of the channel are indicated to be the same for control and data transmissions, the receiver could potentially use the same or similar receive beamforming patterns to receive both the control and the data.

As noted above, in beamformed systems (e.g., in mmWave frequencies), the control region and data region might not use the same beam all the time. In some cases, the UE may only be reachable by a narrow beam used for data transmissions. In such cases, the UE might not be aware of the control region information to exploit for channel estimation for the data region.

Aspects of the present disclosure, however, provide techniques where a transmitting entity may signal information regarding a relationship between beams used for control and data transmissions. As used herein, control transmissions generally refer to control channel transmissions (e.g., PDCCH on the DL, PUCCH on the UL), as well as reference signals (e.g., CSI-RS or SS on the DL, SRS on the UL). The control and data may be on the same subband, on different subbands of a component carrier, or on different component carriers. The data may include DMRS used to demodulate the data. The techniques may be used to signal information that may be used to process downlink transmissions, uplink transmissions, or both. The uplink and downlink transmissions may be on the same subband, on different subbands of a component carrier, or on different component carriers.

For example, a base station (e.g., an eNB or UE acting as a base station in a device to device or D2D scenario) may signal, to a UE, a relationship between the beams used for control transmissions (e.g., for PDCCH or DL RS, such as SS and/or CSI-RS) and data transmissions (for e.g. PDSCH or RS included with PDSCH, such as DMRS or PTRS). The UE may then use this information for channel estimation in both downlink control and data regions. Similarly, a UE may signal, to a base station, a relationship between the beams used for control transmissions (e.g., for PUCCH or SRS) and data transmissions (for e.g. PUSCH). The base station may then use this information for channel estimation in both uplink control and data regions. The relationship signaled by the UE may be one out of a set of possible relationships, where the set may be configured by the base station. In another aspect, the base station may signal this relationship to the UE instead of allowing the UE to choose and signal its choice to the base station.

Figure 9:
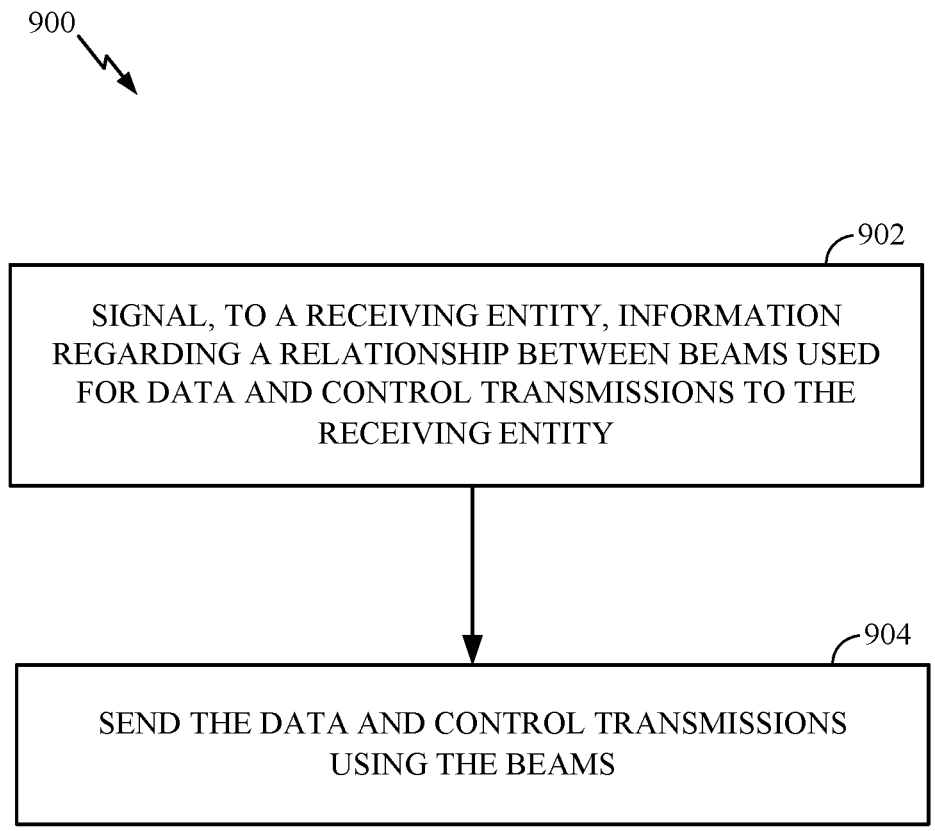
FIG. 9 example operations performed by a transmitting entity, in accordance with certain aspects of the present disclosure.
Figure 10:
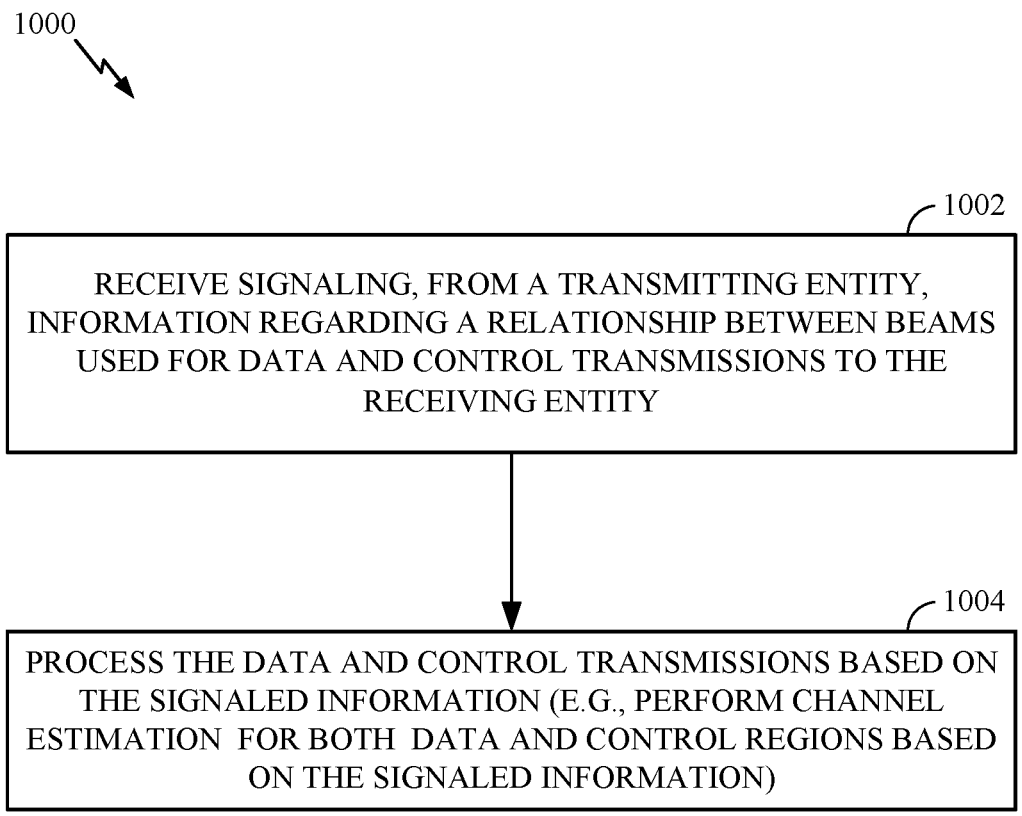
FIG. 10 illustrates example operations performed by a receiving entity, in accordance with certain aspects of the present disclosure.

FIG. 9 illustrates example operations 900 that may be performed by a transmitting entity. For example, the operations 900 may be performed by a BS including one or more modules of the BSs 110 illustrated in FIG. 4 or by a UE including one or more modules of the UEs 120 illustrated in FIG. 4.

The operations 900 begin, at 902, by signaling, to a receiving entity, information regarding a relationship between beams used for data and control transmission to the receiving entity. The operations continue, at 904, by sending the data and control transmissions using the beams.

FIG. 10 illustrates example operations 1000 which may be performed by a receiving entity (e.g., a UE or base station), according to aspects of the present disclosure. Operations 1000 may be considered complementary RX-side operations to the TX-side operations 900.

The operations 1000 begin, at 1002, with the receiving entity receiving signaling, from a transmitting entity, information regarding a relationship between beams used for data and control transmissions to the receiving entity. At 1004, the receiving entity processes the data and control transmissions, based on the signaled information.

According to aspects of the present disclosure, an eNB may signal the beam relationship between the beams used during the control transmission (e.g., for PUCCH) and data transmission (e.g., for PUSCH). In this case, the signaling of beam association information may be via radio resource control (RRC) signaling, PUCCH, or a media access control (MAC) control element (CE).

According to aspects of the present disclosure, an eNB may signal the beam relationship between the beams used during the control transmission (e.g., for PDCCH) and data transmission (e.g., for PDSCH). In some cases, the eNB may signal a configuration of transmission time intervals (e.g., slots and/or subframes) and the type of beam associations between data and control channel transmissions in those intervals.

For example, this information may indicate certain intervals during which the same beams are used for both control and data. Based on this information, a UE may be able to use RS transmitted in the control region for channel estimation in the data region (or vice-versa). In other intervals, the beams may be different, for example, with wider beams used for control than data (as shown in FIG. 8). This may allow flexibility to an eNB (e.g., to transmit to multiple UEs during certain intervals).

The signaling of beam association information from an eNB may be via radio resource control (RRC) signaling, PDCCH, broadcast signaling (e.g., MIB/SIB), or a MAC CE.

The signaled parameters may include various types of association information, such as if both control and data are scheduled using the same beam or phase continuity between control and data reference signals (RS). The signaled parameters may also include a measure of correlation between the beam shapes applied in control and the data region. In some cases, the signaled parameters may include an indication of quasi colocation between the beams used in Control and Data regions. This signaling may allow a receiving device to know whether it can assume QCL (or an assumed degree of quasi-colocation) of control and data to estimate parameters, such as Doppler Spread, delay spread, frequency, and timing, and utilize these for data channel estimation. Alternatively, or additionally, the signaling may also allow a receiving device to know whether it can assume if certain control and data components are spatially QCL'd, meaning QCL with respect to spatial properties, such as beam shape or angle of departure (AoD) from a transmitter. Spatial QCL information may, for example, allow a receiver to use same receive beamforming for 2 signals (data and control) that are indicated as spatially QCL'd.

In any case, the receiving device may utilize this information regarding beam association to enhance channel estimation, both for the data, as well as the control region. In some cases, a UE may receive signaling that the data (PDSCH) channel and the control (PDCCH) channel will be transmitted using the same beam. In this case, the UE may utilize same RS to estimate parameters for both data and control regions.

For example, if the signaling indicates a same beam is used for data and control transmissions (or that signaled parameters indicated data and control transmissions are likely to experience same channel conditions, a UE may use DMRS in the control region to estimate the parameters like delay spread, Doppler, frequency error, timing error, and the like. The UE can utilize this information to enhance channel estimation for the data region.

In some cases, the control and data transmission resources overlap in at least some of the same frequency tones. As an example, control may be in 10-20 Mhz, while data is in 10-30 Mhz or 15-25 Mhz. In this case, if phase continuity is also signaled, then this information may be used by the UE to further enhance channel estimation and also to estimate certain fine imperfections, such as frequency error.

As noted above, by having some slots/subframes where the data and the control will use the same beam and other slots/subframes where the data and control use different beams, an eNB may have some flexibility.

For example, the eNB may apply wider beams for some slots to schedule multiple UEs, while narrower beams (matched to data beam) in other slots help enhance channel estimation for the scheduled UE. In other words, the UE only scheduled on those slots and subframes may utilize the control beam to estimate the channel parameters (e.g., delay spread, Doppler, frequency error, and the like). This information may then be used to enhance channel estimation for the data region.

As noted above, similar beam associations can be signaled (by EnodeB/or by UE) for the Uplink also for example if PUCCH (uplink control) and PUSCH (uplink data) share the same beam and the EnodeB can use the RS from PUCCH to estimate parameters for PUSCH. Assuming PUSCH and PUCCH are in different symbols and they both have RS, it may also be beneficial to signal QCL between the RS and even phase continuity. Either the eNodeB can signal this to the UE or the UE can report saying it will use the same beam for both PUCCH and PUSCH.

In some cases, the techniques described herein may be extended to device to device (D2D) scenarios, for example, where 2 UEs are communicating, with one potentially playing the role of a traditional BS. In such cases, a UE serving as the BS (receiving on the uplink) may tell the other UE (transmitting on the UL) how to relate the UE's UL control and data beams). In some cases, a UE may choose (provide the signaling) for UL. In other cases, a BS may choose for the UL.

In some cases, beam relationship information may be conveyed as a beam relationship metric. The beam relationship metric may, for example, specify the relation between various control transmissions (e.g., PDCCH and/or CSIRS) and data transmissions (e.g, PDSCH and/or CSIRS) and may be generated as a function of one or more parameters of the beams used for data and control transmissions. By separately providing these indications, a device may effectively determine whether or not the control and data (e.g., PDCCH and PDSCH) are QCLed.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a transmitting entity, comprising:
   signaling, to a receiving entity, quasi co-location (QCL) information regarding a relationship between beams used for data and control transmissions to the receiving entity, wherein the QCL information comprises spatial information including an indication of a beam shape associated with at least one of the beams or with receive beamforming for receiving the data and control transmissions; and
   sending the data and control transmissions using the beams.

2. The method of claim 1, wherein the QCL information comprises a configuration of transmission time intervals and a type of beam relationship between the beams used for the data and control transmissions.

3. The method of claim 2, wherein the configuration indicates whether a same beam is used for the data and control transmissions in one or more of the transmission time intervals.

4. The method of claim 2, wherein the transmission time intervals comprise at least one of a subframe or a time slot.

5. The method of claim 2, wherein the configuration indicates:
   a same beam is used for both data and control information in at least some of the transmission time intervals; and
   different beams are used for data and control information in other transmission time intervals.

6. The method of claim 5, wherein the spatial information further includes a spatial parameter associated with the receive beamforming for receiving the data and control transmissions.

7. The method of claim 1, wherein:
   the transmitting entity comprises a base station; and
   the QCL information is provided via at least one of: radio resource control (RRC) signaling, a physical downlink control channel (PDCCH), broadcast signaling, or a media access control (MAC) control element (CE).

8. The method of claim 1, wherein:
   the transmitting entity comprises a user equipment (UE); and
   the QCL information is provided via at least one of: radio resource control (RRC) signaling, a physical uplink control channel (PUCCH), or a media access control (MAC) control element (CE).

9. The method of claim 1, wherein the QCL information indicates whether both control and data are scheduled using the same beam.

10. The method of claim 1, wherein the QCL information indicates at least one of:
    phase continuity between control and data reference signals (RSs);

a measure of correlation between beam shapes applied in control and data regions; or a degree of QCL between the beams used for the data and control transmissions.

11. The method of claim 1, wherein the QCL information indicates whether QCL between the beams used for the data and control transmissions can be assumed for estimating at least one of: Doppler spread, delay spread, frequency offset, timing, or spatial reception information.

12. The method of claim 1, wherein the QCL information is provided as a beam relationship metric generated as a function of one or more parameters of the beams used for the data and control transmissions.

13. A method for wireless communication by a receiving entity, comprising:
    receiving, from a transmitting entity, quasi co-location (QCL) information regarding a relationship between beams used for data and control transmissions to the receiving entity, wherein the QCL information comprises spatial information including an indication of a beam shape associated with at least one of the beams or with receive beamforming for receiving the data and control transmissions; and
    processing the data and control transmissions, based on the received QCL information.

14. The method of claim 13, wherein the QCL information comprises a configuration of transmission time intervals and a type of beam relationship between the beams used for the data and control transmissions.

15. The method of claim 14, wherein the configuration indicates whether a same beam is used for receiving the data and control transmissions in one or more of the transmission time intervals.

16. The method of claim 14, wherein the transmission time intervals comprise at least one of a subframe or a time slot.

17. The method of claim 14, wherein the configuration indicates:
    a same beam is used for both data and control information in at least some of the transmission time intervals; and
    different beams are used for data and control information in other transmission time intervals.

18. The method of claim 17, wherein the spatial information further includes a spatial parameter associated with the receive beamforming for receiving the data and control transmissions.

19. The method of claim 13, wherein:
    the receiving entity comprises a user equipment (UE); and
    the QCL information is received via at least one of: radio resource control (RRC) signaling, a physical downlink control channel (PDCCH), broadcast signaling, or a media access control (MAC) control element (CE).

20. The method of claim 13, wherein:
    the receiving entity comprises a base station (BS); and
    the QCL information is received via at least one of: radio resource control (RRC) signaling, a physical uplink control channel (PUCCH), or a media access control (MAC) control element (CE).

21. The method of claim 13, wherein the QCL information indicates whether both control and data are scheduled using the same beam.

22. The method of claim 13, wherein the information indicates at least one of:
    phase continuity between control and data reference signals (RSs);
    a measure of correlation between beam shapes applied in control and data regions; or
    a degree of QCL between the beams used for the data and control transmissions.

23. The method of claim 22, wherein processing the data and control transmissions, based on the received QCL information comprises:
    performing channel estimation for both data and control regions using a same demodulation reference signal (DMRS).

24. The method of claim 13, wherein the QCL information indicates whether QCL between the beams used for the data and control transmissions can be assumed for estimating at least one of: Doppler spread, delay spread, frequency offset, timing, or spatial reception information.

25. The method of claim 13, wherein the QCL information is provided as a beam relationship metric generated as a function of one or more parameters of the beams used for the data and control transmissions.

26. An apparatus for wireless communication, comprising:
    at least one processor configured to obtain quasi co-location (QCL) information regarding a relationship between beams used for data and control transmissions to a receiving entity, wherein the QCL information comprises spatial information including an indication of a beam shape associated with at least one of the beams or with receive beamforming for receiving the data and control transmissions; and
    a transmitter configured to signal the QCL information to the receiving entity and to send the data and control transmissions using the beams.

27. The apparatus of claim 26, wherein the spatial information further includes a spatial parameter associated with the receive beamforming for receiving the data and control transmissions.

28. An apparatus for wireless communication, comprising:
    a receiver configured to receive, from a transmitting entity, quasi co-location (QCL) information regarding a relationship between beams used for data and control transmissions to the apparatus, wherein the QCL information comprises spatial information including an indication of a beam shape associated with at least one of the beams or with receive beamforming for receiving the data and control transmissions; and
    at least one processor configured to process the data and control transmissions, based on the received QCL information.

29. The apparatus of claim 28, wherein the QCL information indicates whether QCL between the beams used for the data and control transmissions can be assumed for estimating at least one of: Doppler spread, delay spread, frequency offset, timing, or spatial reception information.

30. The apparatus of claim 28, wherein the spatial information further includes a spatial parameter associated with the receive beamforming for receiving the data and control transmissions.

31. A method for wireless communication by a receiving entity, comprising:
    receiving, from a transmitting entity, quasi co-location (QCL) information regarding a relationship between beams used for data and control transmissions to the receiving entity, wherein the QCL information comprises spatial information including an indication of a beam shape associated with receive beamforming for at least one of the beams used for the data and control transmissions; and processing the data and control transmissions, based on the received QCL information.

32. An apparatus for wireless communication, comprising:
- a receiver configured to receive, from a transmitting entity, quasi co-location (QCL) information regarding a relationship between beams used for data and control transmissions to the apparatus, wherein the QCL information comprises spatial information including an indication of a beam shape associated with receive beamforming for at least one of the beams used for the data and control transmissions; and
- at least one processor configured to process the data and control transmissions, based on the received QCL information.

* * * * *